United States Patent [19]

Blumenthal et al.

[11] Patent Number: 4,514,698
[45] Date of Patent: Apr. 30, 1985

[54] CHEMICAL LASER PUMP INCLUDING CRYOGENIC AND CONDENSING MEANS

[75] Inventors: Jack L. Blumenthal, Los Angeles County; John R. Ogren, Orange County; Eugene V. Rutkowski; Marvin Appel, both of Los Angeles County, all of Calif.

[73] Assignee: TRW Inc., Redondo Beach, Calif.

[21] Appl. No.: 139,494

[22] Filed: Apr. 11, 1980

Related U.S. Application Data

[63] Continuation of Ser. No. 286,246, Sep. 5, 1972.

[51] Int. Cl.³ .......................... H01S 3/095; H01S 3/22
[52] U.S. Cl. ........................................ 330/4.3; 372/59
[58] Field of Search .................. 330/4.3; 372/89, 59, 372/33, 57, 90, 705; 252/441, 475, 476; 420/422; 313/356, 634

[56] References Cited

U.S. PATENT DOCUMENTS

| | | | |
|---|---|---|---|
| 2,926,981 | 3/1960 | Stout et al. | 420/422 |
| 3,569,857 | 3/1971 | Macken | 372/59 |
| 3,605,036 | 9/1971 | Barnaby | 330/4.3 |
| 3,641,455 | 2/1972 | Matovich | 372/59 |
| 3,648,194 | 3/1972 | Melikian et al. | 372/59 |
| 3,688,215 | 8/1972 | Spencer et al. | 330/4.3 |
| 3,863,176 | 1/1975 | Martinez et al. | 372/89 |
| 3,928,821 | 12/1975 | Gregg et al. | 372/89 |
| 3,992,685 | 11/1976 | Ogren et al. | 330/4.3 |
| 4,082,834 | 4/1978 | Grossman et al. | 420/422 |
| 4,090,979 | 5/1978 | Ogren et al. | 252/441 |
| 4,196,400 | 4/1980 | Martin | 372/59 |
| 4,200,460 | 4/1980 | Grossman et al. | 420/422 |
| 4,324,765 | 4/1982 | Mastrup et al. | 422/163 |

OTHER PUBLICATIONS

Spencer et al., "Initial Performance of a CW Chemical Laser", 1970, pp. 155–160, Opto-Electronics 2.
Hinchen et al., "cw HF Electric-Discharge Mixing Laser", pp. 386–388, App. Phys. Let., vol. 17, #9.

Primary Examiner—Nelson Moskowitz
Attorney, Agent, or Firm—Donald R. Nyhagen; Noel F. Heal

[57] ABSTRACT

A chemical laser including a laser pump which is relatively lightweight with no moving parts is provided. This produces a low pressure, regenerable, closed system for treating laser cavity exhaust gases to remove (i.e., pump) them from the system.

The exhaust gases which emerge from the laser cavity of the chemical laser are pumped by a combination of condensation, cryogenic adsorption, and by reaction preferably with titanium, titanium-zirconium alloys, zirconium, tantalum, etc. These exhaust gases include hydrogen, deuterium and their halides, the halogens, oxygen, $CO_2$, nitrogen and $H_2O$. This obviates the requirements for heavy equipment normally employed to produce a high vacuum in the laser cavity.

8 Claims, 4 Drawing Figures

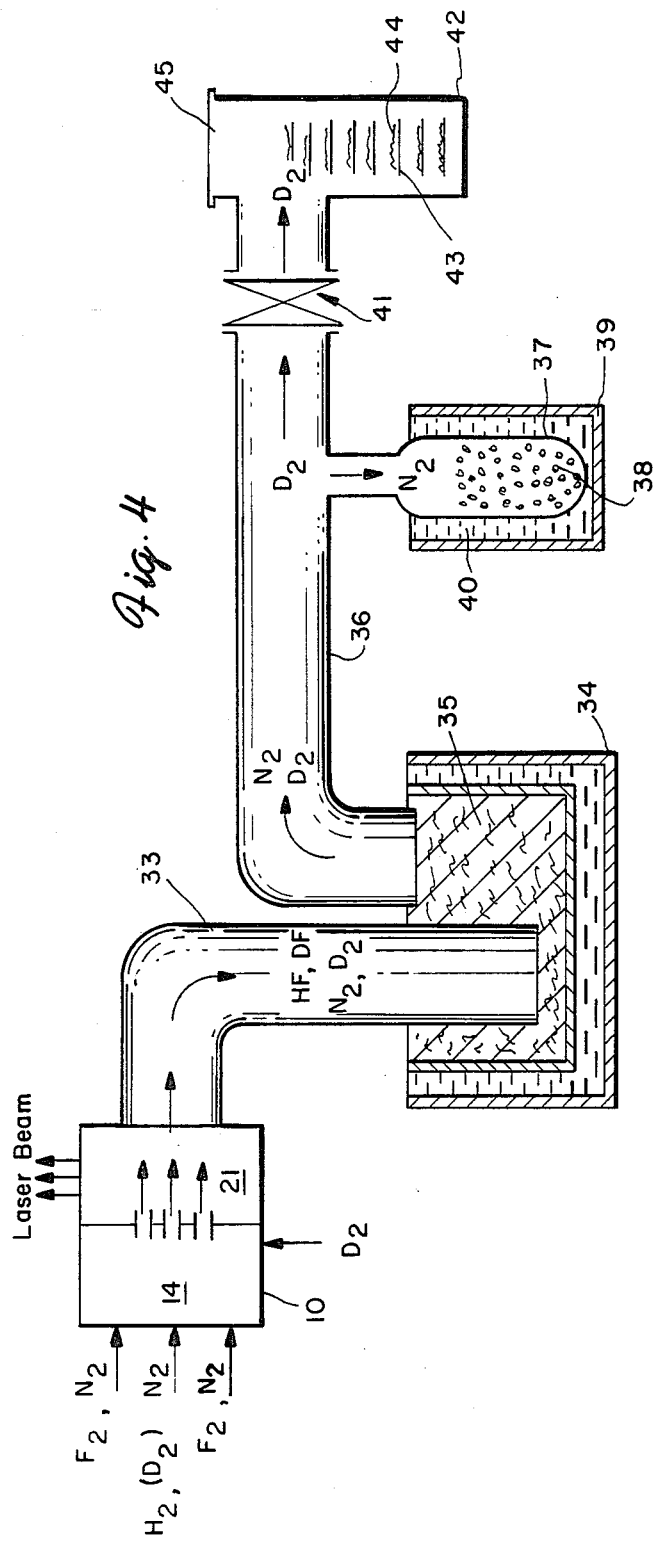
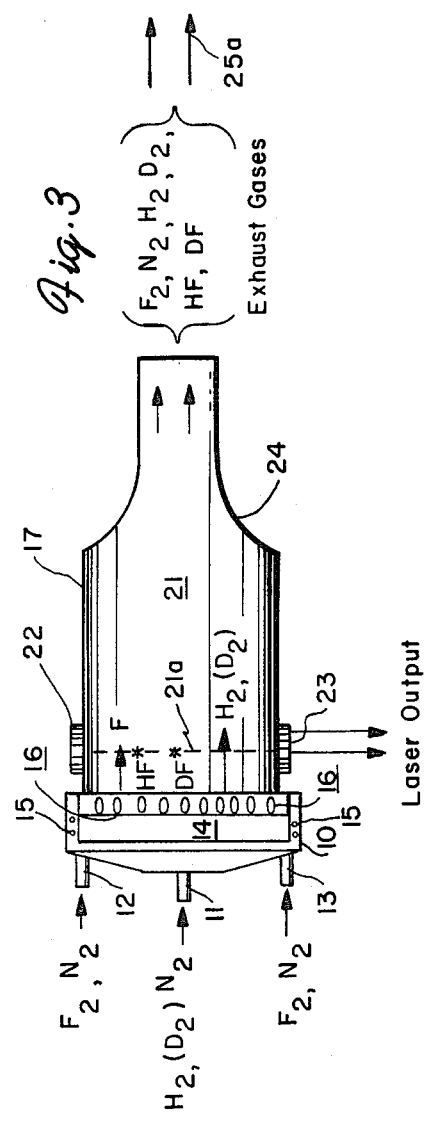

CHEMICAL LASER PUMP INCLUDING CRYOGENIC AND CONDENSING MEANS

The Government has rights in this invention pursuant to Contract No. F33657-72-C-0628 awarded by the Department of the Air Force.

This is a continuation, of application Ser. No. 286,246, filed 9/5/72.

BACKGROUND OF THE INVENTION

This invention relates to a chemical laser and, more specifically, to a chemcial laser pump adapted to quickly remove exhaust gases from the laser cavity.

Chemical lasers typically involve a reaction with hydrogen and/or deuterium and fluorine, chlorine, bromine or iodine in diluent gases of $N_2$, He, etc., to produce hydrogen and deuterium halides. The laser action takes place at pressures of about 15 torr and below from halides such as HF* and/or DF* molecules in the excited vibrational states. Decay to ground level of these excited HF and DF molecules produces a lasing action with an output spectrum varying from about 3.6–4.0 microns for DF and 2.6–2.9 microns for HF.

Not only must population inversion requirements be met, but high temperature and low pressure requirements must also be maintained for lasing action to be sustained. Additionally, exhaust gases at ground level state must be removed very quickly from the laser cavity otherwise they will quench the lasing action. These exhaust gases are at temperature as high as 3000° K.

Hence, the usual practice is to pump the exhaust gases along with the carrier gases such as nitrogen or helium from the laser cavity into the atmosphere. It will be appreciated that at low altitudes it is impossible to naturally vent these low pressure gases into the atmosphere. Pumping requirements are attained using large capacity mechanical ejector, or turbo mechanical pumps; however, this mode of operation presents several difficulties. To begin with, venting hydrogen and deuterium halides to the atmosphere causes a pollution problem. Also, the large weight of the pump can preclude employment of a chemical laser in an aircraft where weight is important.

It is, therefore, an object of this invention to provide a chemical laser provided with a pump suitable for removing high energy, low pressure exhaust gases from the laser cavity without the necessity of discharging these gases into the surrounding atmosphere.

Another object is to provide a process for removing exhaust gases from the laser cavity of a chemical laser.

Another object is to provide a pump for a chemical laser which is smaller and ligher than conventional large capacity mechanical pumps.

Another object is to provide a pump for a chemical laser, the pump having no moving parts and which provides complete containment of the exhaust gases from the laser cavity.

Other objects of the invention will become apparent from the description and diagrams to follow in which:

FIG. 3 is a schematic sectional side elevation of a chemical laser suitable for use in the present invention; and FIG. 4 is a schematic of the cryogenic and chemical pump of this invention functioning in conjunction with a chemical laser.

According to the invention, there is provided a chemical laser including a laser pump for removing low pressure exhaust gases from the laser cavity, the pump including a reactive metal selected from the class consisting of titanium, zirconium, hafnium, vanadium, niobium, tantalum, yttrium, scandium, elements 57–71 of the periodic table, mixtures and alloys thereof, the exhaust gases being selected from the class consisting of hydrogen, deuterium and their halides, the halogens, nitrogen, $CO_2$, oxygen and water vapor.

Other elements, their alloys and mixtures which may also be employed as the pump include lithium, sodium, potassium, rubidium, cesium, beryllium, palladium, magnesium, strontium, calcium, barium, boron, and gallium.

Preferred reactant metals are exemplified by titanium, zirconium and titanium-zirconium alloys; these metals will react with the exhaust gases to form solid reaction products. The reactant metal may be in the form of powder, sponge, foil, etc.; however, the powdered form, because of its high surface area, is preferred.

Generally speaking, cryogenic adsorption is employed to remove and pump nitrogen and $CO_2$; condensation is employed to remove the halides of hydrogen and deuterium, and water vapor. Oxygen, hydrogen, deuterium, and the halogens are pumped by reaction with heated titanium.

The reactions of titanium with oxygen and hydrogen are as follows:

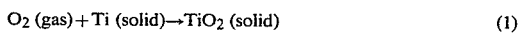

$$O_2 \text{ (gas)} + Ti \text{ (solid)} \rightarrow TiO_2 \text{ (solid)} \qquad (1)$$

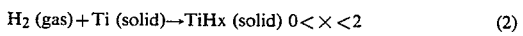

$$H_2 \text{ (gas)} + Ti \text{ (solid)} \rightarrow TiH_x \text{ (solid)} \quad 0 < x < 2 \qquad (2)$$

Deuterium acts in a similar fashion as hydrogen, and both may be regenerated by heating the corresponding titanium compound.

EXAMPLE 1

Figure 1:
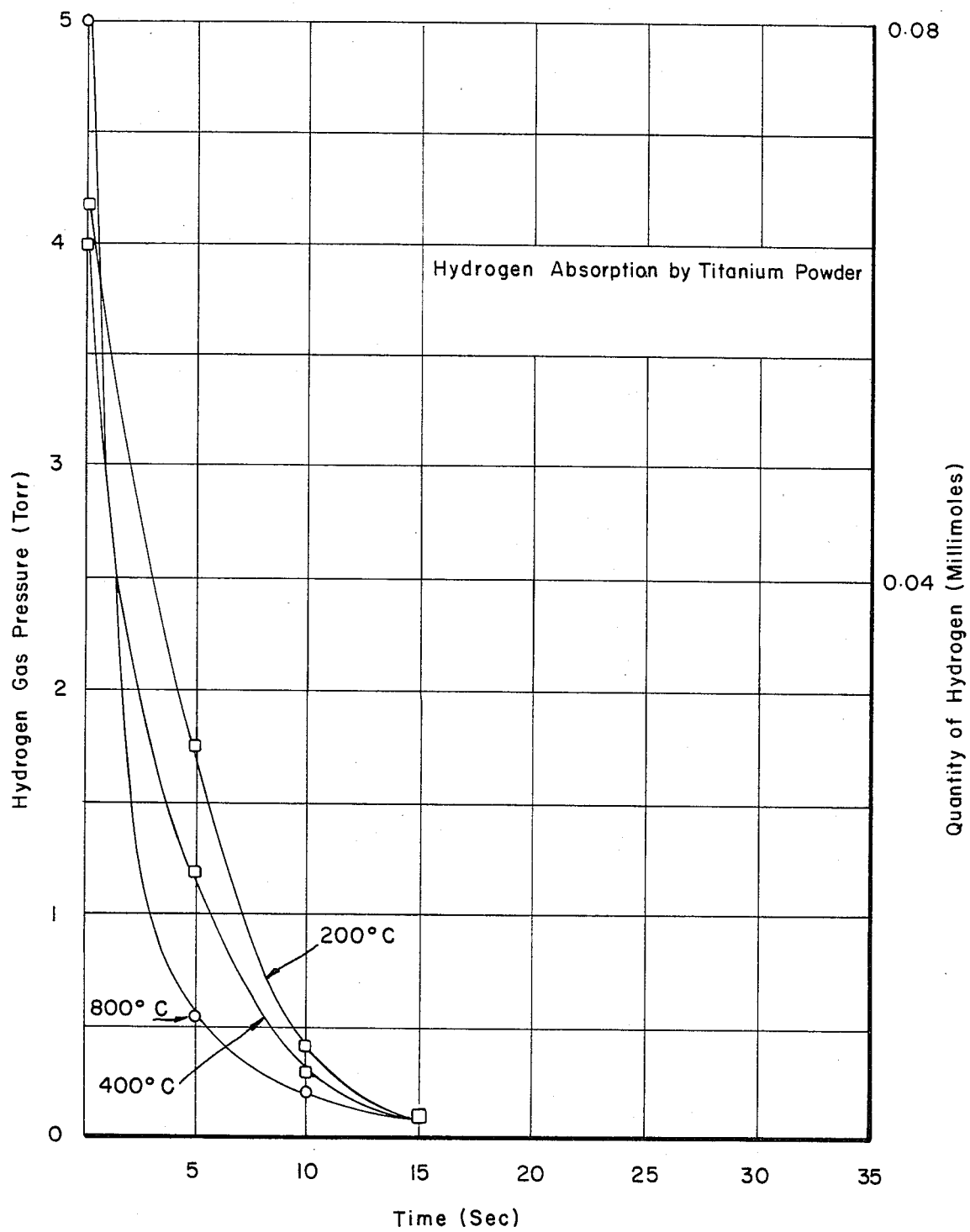
FIGS. 1 and 2 are graphs showing the relation between gas adsorption and pumping or gas removal rate.
Figure 2:
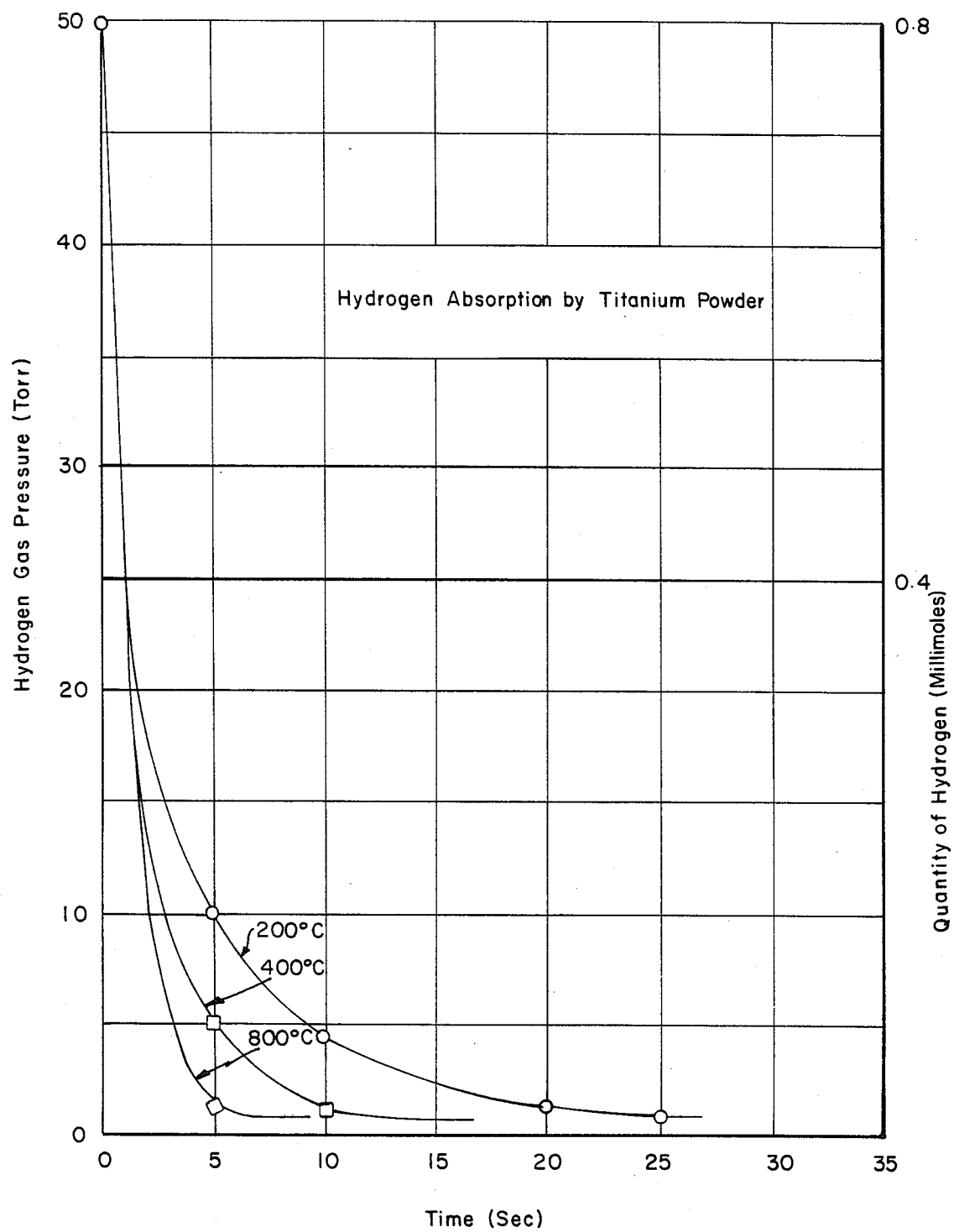

Hydrogen gas at 5 torr pressure was exposed to 1.1844 grams of titanium powder (1030 cm² surface area) in a constant volume reaction chamber. Pressure decrease signified gas removal. FIG. 1 shows the pressure decrease at various temperature levels in the 200° C.–800° C. range at pressures up to 5 torr. FIG. 2 shows the extent of pressure decrease in the temperature range of 200° C.–800° C. and at pressures up to 50 torr. It will be observed that in both cases, a pressure reduction below 10 torr was achieved in less than 10 seconds; this is a sufficiently low pressure for lasing action to occur.

EXAMPLE 2

Hydrogen gas at pressures of 0–7 torr was removed under varying temperature conditions with titanium and with titanium dihydride that had been decomposed under a hard vacuum at 710° C. The data is summarized in Table 1 which follows.

TABLE 1
CHEMICAL PUMPING OF HYDROGEN BY REACTION WITH TITANIUM
(Hydrogen Gas Pressures 0-7 Torr)

| STARTING MATERIAL | PRETREATMENT | | | Temperature (°C.) | HYDROGEN PUMPING RATE DATA | | Final Composition |
|---|---|---|---|---|---|---|---|
| | Temperature (°C.) | Time (Minute) | Environment | | Initial Rate $10^{-6} \frac{\text{moles}}{\text{gm} \cdot \text{sec}}$ | Final Rate $10^{-6} \frac{\text{moles}}{\text{gm} \cdot \text{sec}}$ | |
| Titanium Dihydride | 710 | 10 | Hard Vacuum | 400 | 55 | 20 | $TiH_{1.2}$ |
| Titanium Dihydride | 700 | 120 | Mechanical pump only | 410 | 0.2 | 0.2 | $TiH_{0.2}$ |
| Titanium | 850 | 20 | Hard vacuum[1] | 416 | 16 | 7.8 | $TiH_{0.2}$ |
| Titanium | 710 | 20 | Mechanical[2] pump only | 410 | 19 | 4.2 | $TiH_{0.08}$ |
| Titanium | None | None | Mechanical pump only | 410 | 1.6 | | |
| | | | Raise temperature in presence of $H_2$ | 500 | 88 | 50 | $TiH_{0.2}$ |

[1]Pressure was below 1 micron before $H_2$ was introduced.
[2]Residual gas pressure was about 15 microns when $H_2$ was introduced.

It will be seen from the data that in the case of titanium dihydride, an initial pretreatment of 710° F. for 10 minutes in a hard vacuum resulted in a reaction rate with hydrogen of 55 micromoles of hydrogen per second per gram of titanium dihydride. As the reaction proceeded to the final composition of $TiH_{1.2}$ the reaction rate with hydrogen at 450° C. was still $$\frac{20 \times 10^{-6} \text{ moles}}{\text{gm} \cdot \text{sec}}$$

The data of Table 1 also shows that untreated pure titanium in a vacuum reacted rather slowly with hydrogen at 410° C. However, when the temperature of the untreated titanium was raised to 500° C., the reaction proceeded rapidly (88 micromoles $H_2$/gm. sec) and continued to be rapid even after a substantial amount of hydrogen had reacted.

In operation, a chemical laser is shown schematically in FIG. 3 and comprises a combustor 10 having inlet ports 11, 12 and 13 for the reactants hydrogen, deuterium, and for a halogen such as fluorine. The reactants can also be substance capable of forming $H_2$ and/or $D_2$ and any halide containing substance capable of reacting to produce free halogen atoms. Diluents such as nitrogen, helium, etc., may be injected with or into the reactants through separate inlet ports in either the combustor or into the laser cavity. In the combustor, there is generated a gaseous mixture of halogen atoms and molecules such as F and $F_2$. Water cooling coils 15 are disposed about the outer periphery of the combustor 10; however, the cooling coils may be eliminated depending upon the combustor design. Cavity injection nozzles 16 are provided for F atoms and $F_2$ molecules in a heated state to exit from the combustor and combine with $H_2$, $D_2$ or substances which may form $H_2$ and/or $D_2$ to generate vibrationally excited HF* and DF* molecules. An exhaust manifold 17 is mounted centrally and axially of the combustor 10, and defines a laser cavity 21 immediately adjacent the outlet ports 16. Lasing action occurs along a lasing axis 21a transverse to the gas flow.

Rear mirror 22 and output mirror 23 are provided on opposite sides of the cavity 21 for amplifying and emitting laser radiation produced in the cavity due to HF* and DF* decay.

Rear mirror 22 and output mirror 23 comprise 4"×4" square, spherically concave-ground mirrors with a 118 inch radius of curvature and having a 30 inch separation. The output mirror 23 was an optical flat with a transmittance of about 10%. The rear mirror 22 had a reflectance of about 98%.

For lasing operation, $D_2$ and/or $H_2$ in a nitrogen diluent gas are pumped into the combustor 10 along with $F_2$ at a temperature of about 1500° C.-3000° C. which then forms F and $F_2$, the reaction being hypergolic. A pressure range of 8-50 psi in the combustor is typcial. The gases then flow through the outlet ports 16 into the laser cavity. $H_2$ or $D_2$ separately injected into the laser cavity cause lasing to occur upon forming HF* or DF*. Pressures in the laser cavity are maintained at about 1-10 torr which is suitable for lasing action. Static temperatures of the supersonic flow in the laser cavity may vary from about 200° C.-900° C.

Exhaust gases emerging from the laser cavity such as $H_2$, $D_2$, HF, DF, $N_2$, $O_2$, $CO_2$ and $H_2O$ are passed along the exhaust manifold through a constricted portion 24 which functions as a venturi or diffuser and permits pressure recovery further downstream.

The exhaust gases are then pumped by a combination of cryogenic adsorption and reaction with titanium as shown in equation 1 (supra). This is illustrated generally in FIG. 4 and shows the chemical laser 10 of FIG. 3 and the chemical and cryogenic pump of the present invention.

As shown in FIG. 4, exhaust gases such as $O_2$, $H_2O$, $CO_2$, HF, DF, $N_2$, $H_2$ and $D_2$ are removed along an exhaust manifold 33 mounted centrally of the laser cavity. The exhaust gases are passed into a cold trap 34 containing a condensation medium such as copper wool 35 which is cooled with liquid nitrogen. Hydrogen and deuterium fluorides (and other halides) will condense on the copper wool and be removed from the system.

The remaining gases $N_2$, $H_2$ and $D_2$ are passed along a tube 36 and into a flask 37 containing an adsorbing material 38 such as a molecular sieve. A suitable sieve is sold by the Linde Division of Union Carbide as Linde 5A. This is an "A" type sieve having an average pore size of about 5Å.

The flask is maintained in a container 39 and the system is cooled with liquid nitrogen 40 maintained between the flask and container.

Nitrogen exhaust gases passed along tube 36 are removed from the system by adsorption on the liquid nitrogen-cooled molecular sieve 38, weighing about 32 pounds.

Deuterium and hydrogen remaining after the removal of nitrogen is passed through a pressure reducing valve 41 and into a titanium pump 42 having a removable tray rack 43 loaded with titanium 44 (8.25 pounds) at about 1000° F. A tray cover 45 is provided to permit removal of the rack. The deuterium and hydrogen will react with the heated titanium as shown in equation 2 and be removed from the system.

The total gas flow rate into the cold trap 34 and titanium pump 42 ranged from about 780 ft$^3$/min. at 0.04 psia and ambient temperature to about 9000 ft$^3$/min. at 0.09 psia and 2500° K. Flow rates and test conditions are shown below in Table 2.

TABLE 2

PUMPING COMBUSTION PRODUCTS FROM A $H_2$—$D_2$—$F_2$—$N_2$ LASER

| Interval Between Tests (mins.) | Test Duration (Seconds) | Inlet Flow Rates to the Combustor (Grams/Second) | | | | Calculated Flow Rates of Combustion Species Entering the Pump (Grams/Second) | | | Combustor Chamber Pressure (PSIA) | Steady State Laser Cavity Pressure (PSIA) | Steady State Pump Inlet Pressure Cold Trap Inlet (34) (PSIA) | Steady State Pressure in the Titanium Pump (42) (PSIA) |
|---|---|---|---|---|---|---|---|---|---|---|---|---|
| | | $F_2$ | $H_2$ | $D_2$ | $N_2$ | HF/DF | $D_2$ | $N_2$ | | | | |
| 0 | 5 | .817 | .036 | .089 | 2.032 | .86 | .074 | 2.03 | 8.2 | .091 | .088 | .089 |
| 5 | 5 | .817 | .036 | .089 | 2.032 | .86 | .074 | 2.03 | 20.7 | .084 | .084 | .085 |
| 6 | 20 | .817 | .036 | .089 | 2.032 | .86 | .074 | 2.03 | 20.7 | .090 | .091 | .092 |
| 10 | 4 | 1.634 | .072 | .178 | 4.064 | 1.72 | .148 | 4.06 | 44.6 | .150 | .157 | .157 |
| 6 | 6 | 1.634 | .072 | .178 | 4.064 | 1.72 | .148 | 4.06 | 44.6 | .155 | .160 | .161 |
| 6 | 20 | 1.634 | .072 | .178 | 4.064 | 1.72 | .148 | 4.06 | 44.5 | .174 | .180 | .180 |
| 12 | 20 | — | — | — | 4.064 | — | — | 4.06 | 11.4 | .150 | .147 | — |
| 3 | 20 | — | — | .178 | — | — | .178 | — | — | .044 | .039 | .039 |
| 7 | 20 | 1.634 | .072 | .178 | 5.80 | 1.72 | .148 | 5.80 | 49.8 | .250 | .257 | .258 |

It will be apparent from Table 2 that the pressure in the laser cavity was maintained relatively stable and sufficiently low to achieve lasing activity, and this situation prevailed through 120 seconds of operation. Furthermore, there was a good correspondence of laser cavity pressure pump inlet and titanium pump pressures indicating efficient exhaust gas removal.

Thus, the chemical pump of the present invention removes the exhaust gases from the system employing a chemical reaction, condensation and cryogenic adsorption rather than a mechanical pump. Since all the gases are chemically reacted or physically adsorbed, a completely closed system is provided; this eliminates pollution problems.

A chemical pump of the present invention weighing about 100 pounds can pump the same total laser flow as would require over 1000 pounds of pumping weight using a mechanical pump and scrubber system to produce a similar laser pumping and halide removal.

It will be appreciated that the chemical pump of the present invention is not restricted in its operation to chemical lasers having a combustion chamber but can function in conjunction with chemical lasers in general.

Finally, the present laser system permits recycling of the exhaust gases. This in turn reduces the costs of fresh feed gas and also lessens the chance of contaminating the reactant gases from an external source.

We claim:

1. A chemical laser including a laser cavity, an exhaust, a pump for removing exhaust gases from the laser cavity at a rate and sufficiently low pressure to sustain lasing action and provide a closed system, the pump including a metal selected from the class consisting of titanium, zirconium, hafnium, vanadium, niobium, tantalum, yttrium, scandium, elements 57–71 of the periodic table, lithium, sodium, potassium, rubidium, cesium, beryllium, palladium, magnesium, strontium, calcium, barium, boron, gallium and mixtures and alloys thereof;

the exhaust gases being selected from the class consisting of hydrogen, deuterium and their halides, the halogens, nitrogen, $CO_2$, oxygen and water vapor;

cryogenic adsorption means to remove nitrogen and $CO_2$; and condensing means to remove the halides of hydrogen and deuterium and water vapor; the metal of said pump being adapted to react with oxygen, hydrogen, deuterium and the halogens to form solid reaction products therewith.

2. The chemical laser of claim 1 in which the pump includes a reactor.

3. A chemical laser including a laser cavity, an exhaust, a pump for removing exhaust gases from the laser cavity at a rate and sufficiently low pressure to sustain lasing action and provide a closed system, the pump comprising a metal selected from the class consisting of titanium, zirconium and mixtures and alloys thereof, the exhaust gases selected from the class consisting of hydrogen, deuterium and their halides, the halogens, nitrogen, $CO_2$, oxygen and water vapor;

cryogenic adsorption means to remove nitrogen and $CO_2$; and condensing means to remove the halides of hydrogen and deuterium and water vapor; the metal of said pump being adapted to react with oxygen, hydrogen, deuterium and the halogens to form solid reaction products therewith.

4. The chemical laser of claim 3 in which the pump includes a reactor.

5. A process for pumping a chemical laser comprising, reacting oxygen, the halogens, hydrogen and deuterium exhaust gases with a metal selected from the class consisting of titanium, zirconium, hafnium, vanadium, niobium, tantalum, yttrium, scandium, elements 57–71 of the periodic table, lithium, sodium, potassium, rubidium, cesium, beryllium, palladium, magnesium, strontium, calcium, barium, boron, gallium and mixtures and alloys thereof to form solid reaction products therewith; cryogenically adsorbing nitrogen and $CO_2$; condensing water vapor and the halides of hydrogen and deuterium; and the pumping process occuring at a rate and sufficiently low pressure to sustain lasing action and provide a closed system.

6. A process for pumping a chemical laser comprising reacting hydrogen, oxygen, the halogens and deuterium exhaust gases with a metal selected from the class consisting of calcium, titanium, zirconium and mixtures and alloys thereof to form solid reaction products therewith; cryogenically adsorbing nitrogen and $CO_2$; condensing water vapor and the halides of hydrogen and deuterium; and the reaction occuring at a rate and sufficiently low pressure to sustain lasing action and provide a closed system.

7. A process for operating a chemical laser comprising:

transmitting lasing reactants including flourine forming compounds in a carrier gas into a combustion region;

combining the reactants in the combustor to form atomic fluorine and byproduct gasses;

passing the atomic fluorine and by product gases into a laser cavity to produce lasing action;

pumping oxygen, deuterium, hydrogen and halogen exhaust gases by reaction with a metal selected from the class consisting of titanium, zirconium, hafnium, vanadium, niobium, tantalum, yttrium, scandium, elements 57-71 of the periodic table, lithium, sodium, potassium, rubidium, cesium, beryllium, palladium, magnesium, strontium, calcium, barium, boron, gallium and mixtures and alloys thereof to form solid reaction products therewith;

cryogenically adsorbing nitrogen and $CO_2$;

condensing water vapor and the halides of hydrogen and deuterium; and the pumping process occuring at a rate and sufficiently low pressure to sustain lasing action and provide a closed system.

8. A process for operating a chemical laser comprising:

transmitting lasing reactants including fluorine forming compounds in a carrier diluent gas into a combustion region;

combining the reactants in the combustor to form atomic fluorine and by product gasses;

passing the atomic fluorine into a laser cavity to produce lasing action;

pumping oxygen, deuterium, hydrogen and halogen exhaust gases by reaction with a metal selected from the class consisting of calcium, titanium, zirconium and mixtures and alloys thereof to form solid reaction products therewith;

cryogenically absorbing nitrogen and $CO_2$;

condensing water vapor and the halides of hydrogen and deuterium; and the pumping process occuring at a rate and sufficiently low pressure to sustain lasing action and provide a closed system.

* * * * *

UNITED STATES PATENT AND TRADEMARK OFFICE
CERTIFICATE OF CORRECTION

PATENT NO. : 4,514,698

DATED : April 30, 1985

INVENTOR(S) : Jack L. Blumenthal et al

It is certified that error appears in the above-identified patent and that said Letters Patent is hereby corrected as shown below:

Column 5, line 15, delete "9000" and insert --9500--.

Signed and Sealed this

Twenty-ninth Day of July 1986

[SEAL]

Attest:

DONALD J. QUIGG

Attesting Officer

Commissioner of Patents and Trademarks